(12) United States Patent
Nielsen et al.

(10) Patent No.: US 9,145,982 B2
(45) Date of Patent: Sep. 29, 2015

(54) METHOD AND SYSTEM FOR REPLACEMENT OF EXISTING PIPES

(71) Applicant: Scandinavian No-Dig Centre ApS, Svenstrup (DK)

(72) Inventors: Soren Nielsen, Svenstrup (DK); Jesper Nielsen, Svenstrup (DK)

(73) Assignee: Scandinavian No-Dig Centre ApS, Svenstrup (DK)

( * ) Notice: Subject to any disclaimer, the term of this patent is extended or adjusted under 35 U.S.C. 154(b) by 0 days.

(21) Appl. No.: 14/161,174

(22) Filed: Jan. 22, 2014

(65) Prior Publication Data
US 2014/0205382 A1     Jul. 24, 2014

(30) Foreign Application Priority Data

Jan. 22, 2013   (EP) ..................................... 13000303

(51) Int. Cl.
*F16L 1/036* (2006.01)
*E21B 7/30* (2006.01)
*F16L 55/165* (2006.01)

(52) U.S. Cl.
CPC . *F16L 1/036* (2013.01); *E21B 7/30* (2013.01); *F16L 55/1658* (2013.01)

(58) Field of Classification Search
CPC .................................................. F16L 55/1658
USPC .......................... 405/184, 184.1, 184.2, 184.3
See application file for complete search history.

(56) References Cited

U.S. PATENT DOCUMENTS

| | | | | |
|---|---|---|---|---|
| 4,954,016 A * | 9/1990 | Storgard | ....................... | 405/184 |
| 4,958,959 A * | 9/1990 | St. Onge | ....................... | 405/184 |
| 5,013,188 A * | 5/1991 | Campbell et al. | ............. | 405/184 |
| 5,018,555 A * | 5/1991 | Hawerkamp | ................... | 285/333 |
| 5,078,430 A * | 1/1992 | St. Onge | ....................... | 285/355 |
| 5,360,240 A * | 11/1994 | Mott | .............................. | 285/390 |
| 5,564,863 A * | 10/1996 | Reber | ......................... | 405/184.1 |
| 6,039,505 A * | 3/2000 | Tenbusch, II | .............. | 405/184.3 |
| 6,149,349 A * | 11/2000 | Nikiforuk et al. | ........... | 405/184 |
| 7,255,516 B2 * | 8/2007 | Wentworth et al. | ........ | 405/184.3 |
| 7,578,043 B2 * | 8/2009 | Simpson et al. | .............. | 285/390 |
| 7,887,103 B2 * | 2/2011 | Evans et al. | .................. | 285/333 |
| 2002/0064428 A1 * | 5/2002 | Forrest | .......................... | 405/184 |

FOREIGN PATENT DOCUMENTS

DE          3733463          3/1989

OTHER PUBLICATIONS (DE3733463) European Patent Office, European Search Report, Apr. 8, 2015.

* cited by examiner

*Primary Examiner* — Frederick L Lagman
(74) *Attorney, Agent, or Firm* — Ice Miller LLP

(57) ABSTRACT

The invention relates to a method for renovation and replacement of existing underground pipes and/or the installation of new pipes by using module pipes. The method comprises the step of screwing a second and further module pipe together with the first or consecutive module pipe, if the first or consecutive module pipe has mainly been pushed or pulled into the existing underground pipe.

13 Claims, 3 Drawing Sheets

METHOD AND SYSTEM FOR REPLACEMENT OF EXISTING PIPES

CROSS REFERENCE TO RELATED APPLICATION

This application claims the benefit of and incorporates by reference herein the disclosure of European Patent Application Serial No. 13000303.1, filed Jan. 22, 2013.

TECHNICAL FIELD OF THE DISCLOSURE

The invention relates to a method for renovation and replacement of existing underground pipes and/or the installation of new pipes by using module pipes.

Pipebursting is a well-known method of replacing existing pipes or pipelines by pulling a new and optionally wider pipe through an existing pipe. This technique is described in the early 80ies of the last century, for example, in U.S. Pat. No. 4,299,375, and was developed to more powerful systems for bigger and larger pipes in the last decade of years. The pipebursting is made by pulling a new pipe with a pulling head mounted at the front of the pipe through the underground, the soil or an old pipe, to an excavation in which a pulling machine is placed. The existing pipe optionally is, at the same time, broken into pieces by means of the bursting head having knives or the like at its side. Pipebursting is commonly used for installing long pipes, which are either in one piece or composed of a plurality of pipe segments or modules being welded together before pulling them into the soil or through the old pipe.

Alternatively, pipe-relining methods with pipe push/pull units are known wherein the apparatus engages the pipe to be pushed or pulled into the soil or an old pipe at its front or back. When the starting excavation is too small for installing a long pipe, it is common to use modular or sectional pipes, for replacements or new installations. The same is possible, if the module pipes cannot be welded inside the excavation. In these methods, the module pipes engage into each other by means of a click or push-together type of connection. This type of connection requires specialized equipment to join the individual modules. When being pushed or pulled into the soil or the old pipe, these types of connection rely in most cases on constant mechanical support from the back of the pipe to prevent the module pipes from separating during the installation procedure as it is, for example, shown in DE 37 33 463 A.

The principle of the commonly used methods for joining the connections of module pipes is that a force, either hydraulic or mechanical, will have to be applied to each individual pipe section in order to push them together. FIG. 6 illustrates how a steel chain (P) is taken through a multiple of pipe sections (A). The steel chain (P) is attached to the rear part of the tool (G), which again is attached to the pulling element (E). The hydraulic clamp (L) grips onto the chain (P), which enables it to perform a horizontal pushing action. This action results in the individual pipe sections being pushed together.

An alternative is shown in FIG. 7. FIG. 7 illustrates a more economic version of the hydraulic push clamp, namely a manual mechanical push clamp. The steel chain is replaced by a simple steel rod (R), which again is attached to the rear end of the tool (G). The mechanical push clamp (N) is connected to the steel rod (R). A clockwise manual-turning force is applied to the mechanical push clamp (N), which enables it to perform a horizontal pushing action. This action results in the individual pipe sections being pushed together.

Additionally, the horizontal pushing force created by either the hydraulic or mechanical push clamp will have to be maintained during the entire pulling operation. If the constant pushing force is for some reason lost and the pulling process is continued, spacing will soon begin to appear between the individual pipe sections. If this happens the job will afterwards fail the camera inspection.

In the light of the above problems occurring in common pipe replacing or installing methods it is an object of the present invention to provide an improved method for pulling or pushing module pipes through the soil or old pipe by means of a push/pull unit. A further object is to provide module pipes for the application in this method.

According to an aspect of the invention, the aforementioned object is achieved with a method for installing a new pipe and/or replacing an existing underground pipe by a new one, wherein the new pipe is a module pipe comprised of a number of individual pipe modules, comprising the steps of:
  i. ascertaining or deciding at least two points at the existing underground pipe to be renovated or replaced or, alternatively, in the soil where a new pipe is to be installed without the use of an old underground pipe,
  ii. providing open excavations, manhole shafts or existing pipe access points, from at least two points,
  iii. positioning a push/pull unit in one of said excavations or manhole shafts or at one of said pipe access points,
  iv. connecting a pulling element to the push/pull unit,
  v. pushing or pulling said pulling element through said existing underground pipe or through a pilot bore in the ground,
  vi. attaching said module pipe to said pulling element by using a tool for connecting the pulling element with the module pipe, preferably the first module pipe section,
  vii. pushing and/or pulling said module pipe through the existing underground pipe by using the pulling element driven by the push/pull unit.

According to the method of the invention, the new pipe which is a module pipe is provided in one of the open excavations, manhole shafts or existing pipe access points by connecting a number (that means a plurality of modules or sections, but at least two or more, preferably more than three and up to a few hundreds of modules or sections) of individual module pipes together in order to provide one pipe or pipeline to be installed in the ground. Module pipes are defined as a section of a pipe having threaded connection means at both ends.

The method is particular useful in situations in which a length of a pipe, for example a continuous pipe or a pipe consisting of a plurality of pipe modules, between two points is to be replaced either for renovation or replacing the old pipe and the space in the starting excavation or manhole is limited or a pipe made of a substantially non-bending or stiff material is to be installed. For connecting the individual module pipes, a step of screwing a second and further module pipe together with the first or each consecutive module pipe is used according to the invention. The pipe can easily be elongated in the excavation or manhole by a second or consecutive module pipe if the first or consecutive module pipe has mainly been pushed or pulled into the existing underground pipe or the soil.

Due to the threaded connection, the pipe connections and, thus, the new pipe are suitable for pushing and pulling operations without a constant force applied from the back of the pipe. Thus, the method of the invention is advantageous over the common methods in that applying a constant force is not needed in order to avoid any disengagement of the module pipes. In addition, the new threaded connections allow a stable connection of the module pipes so that they are not being pushed too far into one another, when the force of installation is applied from the back only. Therefore, most of the drawbacks of the common methods caused due to the frictional forces between the underground environment and the outer wall of the new module pipes are eliminated by the new method of the invention.

In the method of the invention, any push/pull unit can be used which is suitable for either drilling, pushing or pulling a drill or a pulling element through an existing pipe, a pilot bore or the soil. The term pulling element defines any element, which is suitably used in such methods for pulling or pushing, or both operations. Exemplified pulling elements are solid or ladder-like rods, chains, ropes, wires, and the like.

According to a further aspect of the invention, the object is achieved by a module pipe which is adapted for connecting a number of said module pipes to provide a pipe for installing a new pipe and/or replacing an existing underground pipe by a new one. In order to be suitably adapted for the aforementioned method of the invention, the module pipe comprises a threaded connection means in both ends. Therefore, the module pipes can be screwed together in order to provide a pipe or pipeline to be installed, replacing an existing underground pipe, or to be newly installed in the soil. A second module pipe can be screwed together with a first or consecutive module pipe if they have a male or female connection means at one of their ends. Alternatively, two different types of module pipes can be used, wherein the first type has two male connection means and the second type has two female connection means. The new pipe is then provided by alternately connecting the first and second types of module pipes.

In the light of the above, the new module pipes according to the invention provide an improved and more reliable connection design for pipes comprised of a plurality of single modules or sections, called pipe modules.

In the following preferred embodiments and advantages of the aforementioned aspects according to the invention are described. The embodiments described for one of the aspects can be used to develop other aspects of the invention in the same manner.

According to a preferred embodiment of the first aspect of the invention, the module pipes can be connected to the pulling element via a pipe pulling connector during the pushing and/or pulling operation of the new pipe into the old underground pipe or the soil. A pulling connector, also called "tool" in the description herein, preferably is a burst head with a threaded connection part at its back portion in which the first module pipe can be screwed. Alternatively, the pipe pulling connector can be provided separately to the burst head and can be connected thereto with a short chain or a flexible adapter element to be more flexible. If the threaded connection means is not used for securing the pulling connector at the front end or back of the first module pipe, a quick lock or press fitting connection means could alternatively be used. As the individual pipes are connected by threaded connection means, the engagement of the pipe connector is preferably at the front end of the new pipe because a constant force from its back is not necessary. This allows an easier general connection and avoids damages inside the new pipe because a steel chain or any other pushing and/or pulling element do not need to go through the new pipe during installation operation.

In a further embodiment of the method according to the invention, an individual extractor frame facilitates the retrieving of the tool into the excavation or manhole, upon the completion of the push/pull operation. The push/pull unit is either positioned behind the extractor frame during the whole pulling operation or is, at the end of the pulling operation, replaced by the extractor frame.

The extractor frame is additionally provided such that it supports the soil at the borehole during the pulling operation. For this reason, the frame may be provided at its side placed against the borehole with a supporting plate having a hole for the pulling element, the new pipe, and the tool. The hole in the support plate may have any fixed sized or may be variable in its size.

In a further embodiment of the method according to the invention, the push/pull unit is located in a remote excavation, manhole shaft or pipe ground access point. The remote excavation is a third excavation used for placing the push/pull unit so that the target excavation can be used for finalizing the pulling operation and for securing the tool. An extractor frame is not necessary which improves the method.

The method according to a further preferred embodiment according to the invention may be operated such that the module pipe is pushed and/or pulled through the existing underground pipe by means of a hydrostatic pushing and/or pulling operation. Hydrostatic push/pull units are well known in the art and generally use bursting heads for widening the borehole or the old underground pipe by means of an expansion adapter element. Hydrostatic means in the sense of the invention that the new pipe is pushed or pulled by means of a hydrostatic force applied at the front end or the backside of the new pipe.

If the soil or the operation conditions are variable during the operation of renovation of an old pipe or of installing a new pipe, it can be advantageous to combine the hydrostatic pushing and/or pulling operation with an air-driven pneumatic pushing operation. Thus, if there are conditions in which the pulling force necessary for pulling the tool or the new pipe will be significantly larger than the normal pulling force, for example, when there is any hindrance in the old pipe or borehole, the additional use of a pneumatic pushing operation can lower the general pulling force. Of course, the hydrostatic pulling can generally be supported by a pneumatic pushing operation in order to improve or speed up the renovation or installation operation. In addition, the combination is advantageous in preventing damages to the new pipes due to excessive tension or protrusion objects in the soil damaging the pipe.

In an alternative embodiment according to the present invention, the module pipe can be pushed and/or pulled through the existing underground pipe by means of a pneumatic pushing and/or pulling operation alone. In this case, it is preferred to install the module pipe by an air-driven pneumatic impact tool.

A further preferred embodiment of the method according to the invention comprises the steps of temporarily stopping or pausing the pulling action when the module pipe arrives at the end point and completing the method by means of digging down to the new pipe. Thus, the bore head or the tool can easily be secured or retrieved from the soil at the final destination of the first module pipe of the new pipe. Docking the module pipe inside the manhole or excavation end point for getting access to the new pipe, is not necessary anymore, since you got access by digging down to the new pipe.

The module pipe adapted for connecting a number of said module pipes for being used in the method according to the invention preferably comprises a number of sealing means in one or both ends. Exemplified sealing means are gaskets or sealing rings made of an appropriate material such as a rubber sealing ring or silicone gasket. At least one sealing means is provided in the connection portion of at least one end of the module pipe. Two or more sealing means may be provided in order to improve the sealing effect and to have a more reliable sealing action over the lifetime of the connections. The sealing means are preferably provided at the end portion of the threaded part or a special part behind the threaded part of the connection means in order to avoid any damage of the sealing means by the tread connection means. The tread and sealing means can be lubricated to minimize friction, during the assemble process between the individual modules.

In a preferred embodiment of the pipe module according to the invention, the pipe is mainly composed of a plastic material. Exemplified plastic materials are high-density polyethylene (HDPE), polypropylene (PP), or thermoplastic materials (TP). Of course, the inventive concept is not limited to plastic pipes but can be used in pipes made of a metal, ceramic material, or concrete as long as a respective threaded connection means can either be provided in the pipe material or can be inserted and fixedly held at the end portions of the pipe modules by any other fixation.

According to the invention, a preferred embodiment of the module pipe comprises threaded connections at both ends of the module pipe, while the threaded connection at the first end is a tapered male connection and the threaded connection at the second end is a tapered female connection. Thus, it is easily possible to provide a new pipe or pipeline from a number of such module pipes by means of screwing them together.

In order to allow a good installation in the old underground pipe or in the soil, the module pipe according to a further embodiment comprises an outer circumference of the module pipe, which is the same over its whole length. That means that the whole pipe made of several module pipes does not have significant protrusions or recesses, which can cause any blocking actions during the installation operation.

In the following the method and the module pipe according to the invention are described in more detail by reference to the following description of particular embodiments and the accompanied drawings, in which:

FIG. 1 shows a general overview of the method according to a first embodiment of the invention, FIG. 2 shows the configuration of the push/pull unit according to the first embodiment of the invention at the end of the pulling operation, FIG. 3 shows the configuration of the extractor frame according to a second embodiment of the invention at the end of the pulling operation, FIG. 4 shows two module pipes according to a third embodiment of the invention in a state of being not connected, FIG. 5 shows two module pipes according to the third embodiment of the invention in a state of being connected with each other, FIG. 6 shows a method for replacing an old pipe with a module pipe according to the state of the art.

The invention will be described in the following by particular embodiments. However, the invention shall not be restricted to these embodiments and the skilled person knows alternatives and modifications of these embodiments, which would be covered by the scope of the claims.

Figure 1:
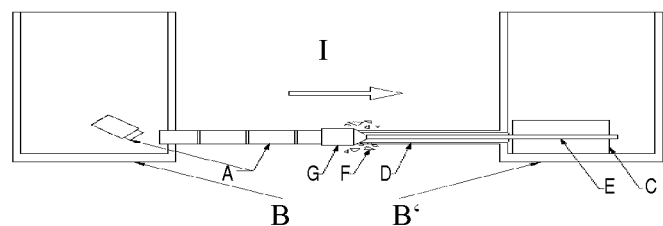

FIG. 1 shows a general overview of the method according to a first embodiment of the invention. A new pipe, comprising a plurality of module pipes, replaces an existing underground pipe. The FIG. 1 shows a starting excavation (B) and a target excavation (B'). An old underground pipe (D) is replaced by a new pipe consisting of a number of individual module pipes (A). At the front end of the new pipe, a tool (G) is attached which is connected with the pulling element (E). The module pipes (A) and the tool (G) are pulled from the starting excavation (B) to the target excavation (B') by operating the push/pull unit (C) located in the target excavation (B'). The pulling direction is identified by the arrow (I).

During operation of the push/pull unit (C) the pulling element (E) pulls the tool (G) and the new pipe connected thereto to the target excavation (B'). The push/pull unit (C) is a hydrostatic pipeburster unit with a clamp system for gripping and pulling the pulling element (E) by repeated gripping and pulling actions in a stepwise manner. The tool (G) is not only adapted for connecting the pulling element (E) with the new pipe, but widens the diameter of the borehole and brakes the old pipe (D) into fragments (F) which will then be pushed into the soil.

The new pipe is comprised of a number of individual module pipes (A) made of a plastic material, which is pulled into the borehole. As soon as the first module pipe (A) has mainly been pulled into the borehole, a second module pipe (A) is positioned in the start excavation for being connected to the first module pipe (A). According to the invention the second module pipe (A) is screwed into the first module pipe (A) (not shown in the FIG. 1). The process of installing the new module pipes, is undertaken in the same manner as described with regard to the before mentioned two module pipes (A) until the first module pipe (A) of the new pipe has reached the target excavation (B'). The pulling process is carried out by using individual module pipes (A) in the respective number needed for the whole length, between the starting excavation (B) and the target excavation (B').

Figure 2:
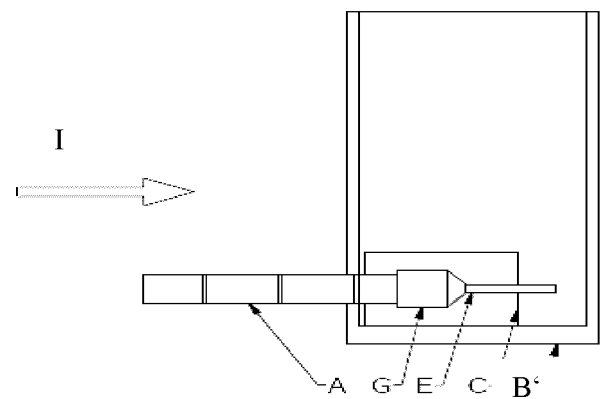

In FIG. 2, the situation is shown where the new pipe comprised of a number of module pipes (A), arrives at the end point. The pulling action of the push/pull unit (C) is paused. For completing the replacement job the module pipe (A) is docked inside the target excavation (B'). The new module pipes form a complete length of pipe, corresponding with the length of the former underground pipe.

Figure 3:
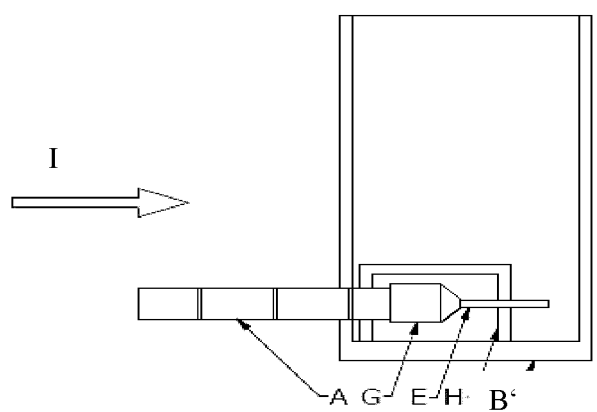

FIG. 3 shows the configuration of the system at the end of the pulling operation according to a second embodiment of the invention. In this embodiment, an extractor frame (H) is used for facilitating the retrieving of the tool (G). The push/pull unit (not shown) can either be replaced by the extractor frame (H) within the excavation (B') or can be placed outside the excavation (B') if there is not enough space for the extractor frame (H) and the push/pull unit. If no further pulling operation is needed, the push/pull unit is no longer necessary and the extractor frame (H) can be used for completing the retrieving of the tool (G) and the pulling element (E).

Figure 4:
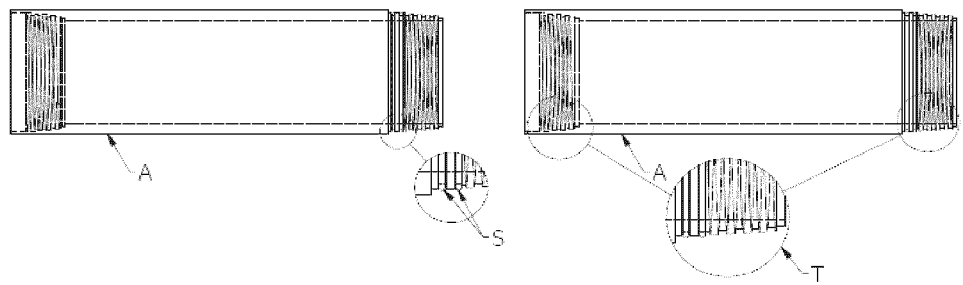

FIG. 4 shows two module pipes according to a third embodiment of the invention in a state of being not connected with each other. Both module pipes (A) are identical and have on their left end, a female type connection means (T) and on their right side a male type connection means (T). Both connections means have a complementary threaded structure so that they can easily be connected together by screwing the male type connection means into the female type connections means.

In addition to the threaded connection means, each male type connection means has two seal rings (S) at a position between the threaded and tapered end portion and the outer pipe body in order to seal the connections of two connected module pipes (A).

Figure 5:
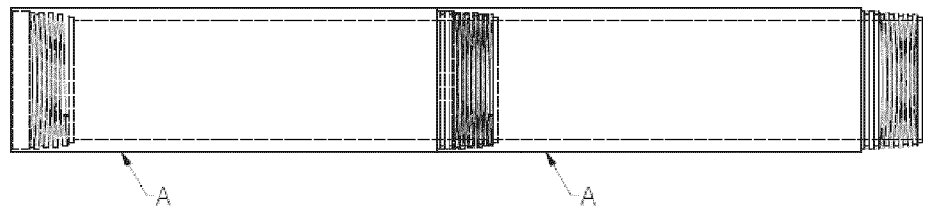

FIG. 5 shows two module pipes (A) according to the third embodiment of the invention in a state of being connected with each other. The pipe composed of the module pipes according to the invention has a substantially smooth outer surface without any significant recesses or protrusions due to the specific threaded connection. Therefore, the stable connection and the smooth outer surface of the pipes prepared by the module pipes (A) allows to install the pipes with a pulling action at the front of the new pipe only. In addition, the new module pipes can easily be installed in the ground with the well-known push/pull units either by pulling or pushing or drilling action or any combination thereof. The reason being they cannot be pulled out of the first module pipe or pressed into the first module pipe from the back, due to the firm and stable connection of the module pipes.

Figure 6:
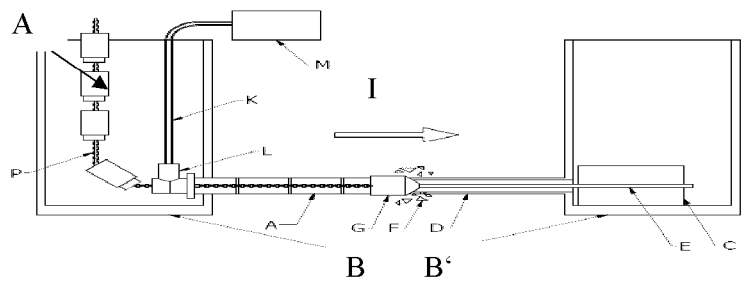
Figure 7:
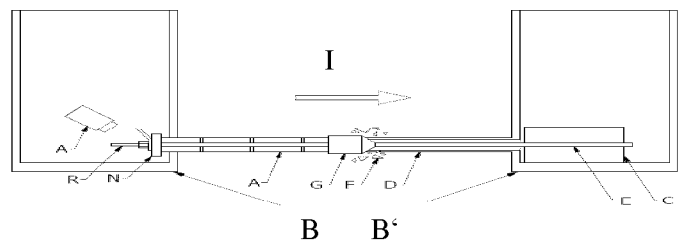
FIG. 7 shows a method for replacing an old pipe using an economic version with a module pipe according to the state of the art using a manual mechanical push clamp.

FIGS. 6 and 7 show two alternative common methods in which the module pipes are pushed by a constant force from their backside, which has been explained in detail before.

Figure 8:
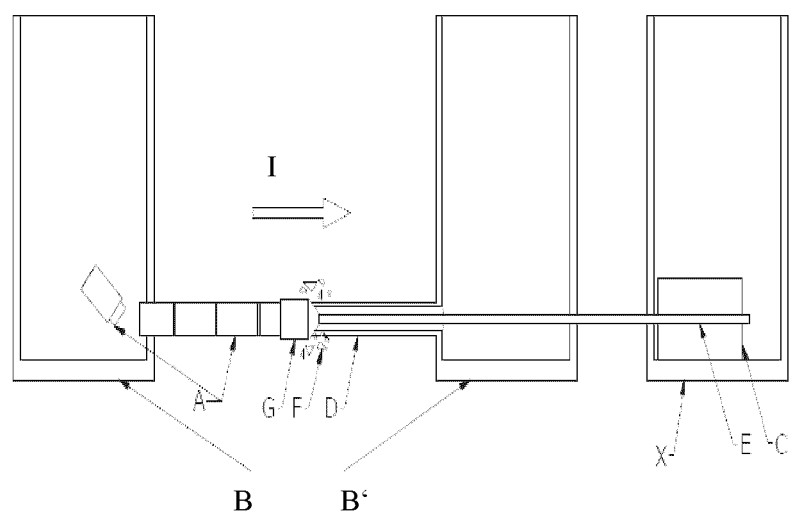
FIG. 8 shows a schematic drawing of a pipe bursting arrangement according to another embodiment of the invention.

FIG. 8 shows a schematic drawing of a pipebursting arrangement according to another embodiment of the invention. The same general pulling process as shown in FIG. 1 and FIG. 2 is used wherein the push/pull unit (C) is placed in a third excavation which is called remote location (X). For replacing a pipe or preparing a pilot bore between the two excavations (B) and (B'), the push/pull unit is positioned in the remote location (X) from where you have access to the pulling element (E) used for the pushing or pulling action. Thus, a push/pull unit is not present in the docking excavation, the tool (G) can be pulled into the excavation (B') at the end of the pulling process. From this excavation, the tool (G) can easily be secured without any need of an extractor frame, which is usually used in the pipebursting processes.

Alternatively to the above-described process, you can start the process as shown in FIG. 1 and FIG. 2 wherein the excavation (X) in FIG. 8 is identical to excavation (B') in the first embodiment. If you have finished the job, that means if the first pipe module (A) of the new pipe has reached its final position, you can dig down to the new pipe (this would be excavation (B') in FIG. 8) to get access to the new pipe and to secure the tool (G).

The invention has been described by reference to some preferred embodiments, but the accompanied claims give the whole scope of protection. Modifications and changes are well known to the skilled person. For example, he would be in the position to transfer the embodiment shown in the drawings to a pulling operation where the force is brought to the new pipe from its backside that means the side in the starting excavation. Moreover, he will easily gather from the description before that both operations can be combined, for example by a hydrostatic pulling operation and a pneumatic pushing operation. Alternatively, he knows how to combine a drilling operation with one of the aforementioned exemplified installation or renovation methods.

The invention claimed is:

1. A method for installing a new pipe and/or replacing an existing underground pipe by a new one, wherein the new pipe is a module pipe comprised of a number of module pipes, comprising the steps of:
    ascertaining at least two points at the existing underground pipe or in the soil where a new pipe is to be installed,
    providing open excavations, manhole shafts or existing pipe access points in the at least two points,
    positioning a push/pull unit in one of said excavations or manhole shafts or at one of said pipe access points,
    connecting a pulling element to the push/pull unit,
    connecting a tool to the pulling element,
    pushing or pulling said pulling element through said existing underground pipe or through a pilot bore in the ground so that said tool breaks said existing underground pipe or increases a diameter of said pilot bore in the ground,
    attaching said module pipe to said pulling element by using the tool,
    pushing and/or pulling said module pipe through the existing underground pipe by using the pulling element driven by the push/pull unit,
    characterized in that the method comprises the step of screwing a second and further module pipe together with the first or consecutive module pipe if the first or consecutive module pipe has mainly been pushed or pulled into the existing underground pipe.

2. The method according to claim 1, wherein the new pipe is pushed and/or pulled from an open excavation, manhole shaft or pipe access point at the first point to the target excavation or manhole or pipe ground access point by using an individual extractor frame for retrieving the tool at the end of the pushing or pulling operation.

3. The method according to claim 1, wherein the pulling element is located in a remote excavation, manhole shaft or pipe ground access point and is operated by means of a connection means for connecting the pulling element with the push/pull unit, which is not directly connected with the existing pipe or pilot bore in the ground.

4. The method according to claim 2, wherein the individual extractor frame is located in a remote excavation, manhole shaft or pipe ground access point and is operated by means of a connection means for connecting the individual extractor frame with the push/pull unit, which is not directly connected with the existing pipe or pilot bore in the ground.

5. The method according to claim 1, wherein the module pipe is pushed and/or pulled through the existing underground pipe by means of a hydrostatic pushing and/or pulling operation.

6. The method according to claim 2, wherein the module pipe is pushed and/or pulled through the existing underground pipe by means of a hydrostatic pushing and/or pulling operation.

7. The method according to claim 5, wherein the hydrostatic pushing and/or pulling operation is combined with an air-driven pneumatic pushing operation.

8. The method according to claim 6, wherein the hydrostatic pushing and/or pulling operation is combined with an air-driven pneumatic pushing operation.

9. The method according to claim 1, wherein the module pipe is pushed and/or pulled through the existing underground pipe by means of a pneumatic pushing and/or pulling operation.

10. The method according to claim 2, wherein the module pipe is pushed and/or pulled through the existing underground pipe by means of a pneumatic pushing and/or pulling operation.

11. The method according to claim 9, wherein the module pipe is installed by an air-driven pneumatic impact tool.

12. The method according to claim 10, wherein the module pipe is installed by an air-driven pneumatic impact tool.

13. The method according to claim 1, comprising the steps of pausing the pulling action when the module pipe arrives at the end point and completing the method by means of digging down to the new pipe.

* * * * *